United States Patent [19]

Barden

[11] Patent Number: 4,658,396
[45] Date of Patent: Apr. 14, 1987

[54] REDUNDANCY ARRANGEMENT FOR A LOCAL AREA NETWORK

[76] Inventor: Robert A. Barden, 3 Coraway Rd., Setauket, N.Y. 11733

[21] Appl. No.: 710,514

[22] Filed: Mar. 11, 1985

[51] Int. Cl.[4] .............................. H04J 1/16; H04J 3/02
[52] U.S. Cl. .......................................... 370/16; 370/85
[58] Field of Search ................ 370/16, 25, 26, 29, 370/32, 85; 340/825.5, 825.01; 179/170 R, 175.3 S

[56] References Cited

U.S. PATENT DOCUMENTS

| | | | |
|---|---|---|---|
| 3,924,077 | 12/1975 | Blakeslee | 370/85 |
| 4,063,220 | 12/1977 | Metcalfe et al. | 370/85 |
| 4,099,024 | 7/1978 | Boggs et al. | 370/94 |
| 4,129,750 | 12/1978 | Mattern | 370/16 |
| 4,423,506 | 12/1983 | Kawasaki et al. | 370/85 |
| 4,545,049 | 10/1985 | Kammerer et al. | 370/16 |
| 4,568,930 | 2/1986 | Livingston et al. | 370/85 |
| 4,608,685 | 8/1986 | Jain et al. | 370/94 |

Primary Examiner—Douglas W. Olms
Assistant Examiner—Frank M. Scutch, III
Attorney, Agent, or Firm—Spencer and Frank

[57] ABSTRACT

A local area network for a multiple access communication system includes a bidirectional communication bus for providing a bidirectional transmitting medium for data signals. The bus includes at least two segments for providing alternate paths for the data signals. A plurality of stations are connected to the bus. Each station includes transceiver means for transmitting data signals onto the bus and for receiving data signals from the bus. A plurality of controllable switch means are provided each being connected for selectively disabling at least one of the transmitting and receiving functions of a respective one of the transceiver means. The transceiver means include first and second groups of transceiver means. Each group is connected to a respective one of the two bus segments. A central control means is connected to each controllable switch means and has a first mode for causing the plurality of controllable switch means to disable at least one of the transmitting and receiving functions of each transceiver means in only the first group and a second mode for causing the plurality of controllable switch means to disable at least one of the transmitting and receiving functions of each transceiver means in only the second group.

10 Claims, 5 Drawing Figures

REDUNDANCY ARRANGEMENT FOR A LOCAL AREA NETWORK

BACKGROUND OF THE INVENTION

This invention relates to a redundancy arrangement for a local area network, and particularly to a redundancy arrangement for a multiple access communication system having a bidirectional communication bus.

Local area networks (LAN'S) have been developed for interconnecting various data using devices, such as general purpose computers, personal computers, remote terminals, and peripheral devices, which are situated in limited geographical areas, such as an office building or a research center. A basic characteristic of local area networks is that all using devices are continuously and physically attached to a common communication medium, such as a coaxial cable, whereby each using device may selectively communicate with any other using device on the network. Typical communications provided by a LAN in the modern business environment include those necessary for office automation, management information systems, management graphics, production control, word processing and voice and video applications. Because of the large volume of communications which a LAN may be carrying, reliability of the LAN, and in particular the communication medium, is of great importance.

The most common communication medium for local area networking is coaxial cable; however, other suitable medium such as fiber optic cable have also been used.

Due to various losses in the communication medium, the implementation of some classes of LANs over the geographical area represented by an office complex or a research facility generally requires the use of several cable segments tied together across repeater stations which receive, amplify and retransmit the communication traffic. If any one of the cable segments is damaged, all or part of the network could be rendered unusable.

For example, a typical application of a baseband LAN installed in a high rise building involves the use of at least three segments of cable. Separate horizontal cable segments installed on each of at least two floors of the building are interconnected by a single cable segment, referred to as a vertical riser, which is tied to each horizontal cable segment via respective repeater stations. Data using devices connected to a horizontal cable on one floor may then communicate with using devices on another floor of the building via the vertical riser. If the vertical riser cable should be damaged, this could prevent a using device on one floor of the building from communicating with a using device located on another floor.

It would thus be desirable to have a redundancy arrangement to avoid this risk of failure in the communication medium.

In a LAN of the type comprising a multiple access communication system having a bidirectional communication bus, such as the now well known ETHERNET LAN, the provision of a redundancy arrangement for the communication medium is not a straightforward problem. In such a system there can be only one path between any two using devices connected to the communication medium in order to prevent data transmitted from one using device from colliding with itself somewhere on the medium and thus resulting in a jumbled transmission. Consequently, in providing redundancy in the communication medium for a multiple access system having a bidirectional communication bus, care must be taken to avoid simultaneous alternative paths for the transmission of data between any two using devices connected to the system.

SUMMARY OF THE INVENTION

It is an object of the present invention to improve the reliability of a local area network.

It is a further object of the invention to provide a redundancy arrangement for a local area network of the type comprising a multiple access communication system having a bidirectional communication bus.

It is another object of the invention to provide a redundancy arrangement for the communication medium of a local area network of the type comprising a multiple access communication system having a three or more segment bidirectional communication bus, while avoiding a configuration of the communication medium which could result in two or more simultaneous communication paths between two using devices connected to the system.

The above and other objects are accomplished in accordance with the invention wherein a redundancy arrangement is provided for a multiple access communication system having a bidirectional communication bus for carrying data signals, with the bus being composed of at least first, second and third segments, and further including a first plurality of bidirectional repeater stations, each of which connects the third segment to a respective one of the first and second segments for providing bidirectional data transmission between the first and third segments and between the second and third segments. According to the invention the arrangement further includes a fourth bus segment and a second plurality of bidirectional repeater stations each connecting the fourth segment to a respective one of the first and second segments for providing bidirectional data transmission between the first and fourth segments and between the second and fourth segments. A plurality of controllable switch means is provided wherein each such switch means is connected for selectively enabling the bidirectional data transmission of a respective one of the repeater stations. A central control means is connected to each of the controllable switch means for producing a first operating mode control signal for causing the plurality of controllable switch means to enable bidirectional data transmission of only the first plurality of repeater stations. The central control means produces a second operating mode control signal for causing the plurality of controllable switch means to enable bidirectional data transmission of only the second plurality of repeater stations.

Thus, in accordance with the invention the risk of failure in a three segment communication bus in a LAN of the above type is minimized by the provision of a fourth cable segment which is tied across each of the first and second cable segments via respective repeater stations. In order to prevent data transmitted from one of the using devices from colliding with itself by traversing both the third and fourth cable segments, the invention provides that each repeater station has a controllable switch which can selectively enable or disable the bidirectional transmission of that repeater station. The central control device connected to each controllable switch produces a signal in one state of the central control device which in essence disconnects the first and second cable segments from the third cable segment while connecting them to the fourth cable segment; and in the other state the third cable segment is connected to the first and second cable segments while the fourth cable segment is disconnected. Thus, if one of the third or fourth cable segments is damaged the remaining undamaged one can be switched in to maintain the integrity of the entire system. However at no point in time are both the third and fourth cable segments simultaneously connected for bidirectional transmission of data. Thus, the present invention provides a redundancy in the communication medium in a manner which will ensure that data transmitted by one using device has only one communication path between that using device and any other using device connected to the system.

In another aspect of the invention a local area network is provided for a multiple access communication system which includes a bidirectional communication bus for providing a bidirectional transmitting medium for data signals. The bus includes at least two segments for providing alternate paths for the data signals. A plurality of stations are connected to the bus. Each station includes transceiver means for transmitting data signals onto the bus and for receiving data signals from the bus. A plurality of controllable switch means are each connected for selectively disabling at least one of the transmitting and receiving functions of a respective one of the transceiver means. The transceiver means includes first and second groups of transceiver means. Each group is connected to a respective one of the two bus segments. Central control means are connected to each controllable switch means and has a first mode for causing the plurality of controllable switch means to disable at least one of the transmitting and receiving functions of each transceiver means in only the first group and a second mode for causing the plurality of controllable switch means to disable at least one of the transmitting and receiving functions of each transceiver means in only the second group.

DESCRIPTION OF THE PREFERRED EMBODIMENTS

Before describing the preferred embodiment of the invention, the ETHERNET LAN referred to above, with which the present invention is particularly useful, will first be described. While the invention will be described in the context of ETHERNET, it should be understood that the invention may be used with other local area networks of the type comprising a multiple access communication system having a bidirectional communication bus.

ETHERNET is disclosed in U.S. Pat. Nos. 4,063,220 and 4,099,024, both of which are incorporated herein by reference. Thus the following description of ETHERNET will cover only those features which are necessary for an understanding of the principles of the present invention.

ETHERNET is a baseband system in which all using devices occupy the same frequency channel. Data is transmitted in groups, referred to as data packets, which are impressed directly on the cable rather than being modulated onto a carrier signal as in known broadband systems. In ETHERNET only one data packet may occupy the channel at any one time since the interference of two data packets on the medium results in jumbled data. ETHERNET uses an access protocol (process for accessing the communication medium) known as Carrier Sense Multiple Access/Collision Detection (CSMA/CD) to ensure that only one using station accesses the medium at a time. In the ETHERNET CSMA/CD system, control for access to the communication medium is distributed among the various using stations connected to the medium. Each station in the network is equipped to sense the presence of carrier, i.e., data on the communication medium, and appropriately defers its own transmission until the medium is clear. Each station is also equipped to detect collisions on the medium and signal other stations of such collisions so as to avoid further transmissions until the medium is clear. The interferring or colliding transmissions are then retransmitted in sequence. When a station determines that its transmission is experiencing interference, it transmits a jam signal on the communication medium to insure that all other stations will detect the collision and then it aborts its transmission.

Figure 1:
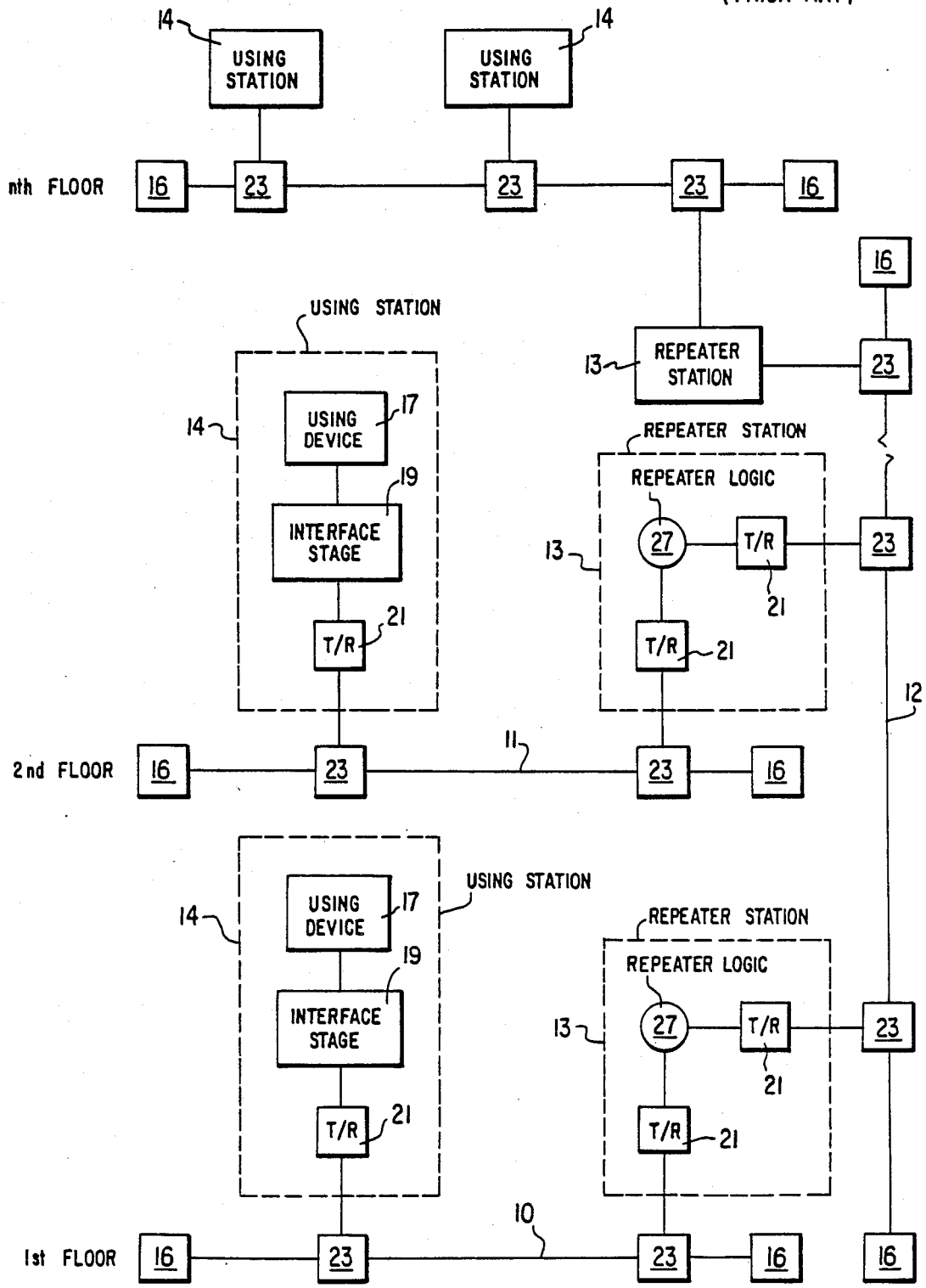
FIG. 1 is a block circuit diagram of a known local area network having, three cable segments.

FIG. 1 is a schematic representation of a typical multi-segment ETHERNET installation in a highrise building having n floors. However, in the following discussion only the ETHERNET installation on the first two floors will be discussed in detail, the installation on the remaining floors being similar to the first two floors. Horizontal cable segments 10 and 11, to which using stations 14 are connected, are installed on floors 1 and 2 respectively, and are interconnected by a vertical cable segment 12 and respective bidirectional repeater stations 13. It can be seen that a using station may establish communications with another using station on any other floor without passing through more than two repeater stations. While the convoluted routes which cables often have to take through large buildings can quickly consume the maximum cable lengths permitted by ETHERNET constraints, this technique of using a separate vertical riser cable permits the complete cabling of most high-rise buildings.

Coaxial cables 10, 11 and 12 are coaxial cables which are isolated relative to each other. Each end of each cable has a terminator 16 which is a conventional impedance matching device, such as a resistor selected to limit reflections.

Each using station 14 includes a data using device 17, such as a personal computer, remote terminal, etc, coupled to a transceiver (T/R) 21 via an interface stage 19. Each transceiver 21 is connected to a coaxial cable by a tap 23. Data to be transmitted on the medium from one using device 17 to another using device 17 is placed into data packets by the interface stage 19 associated with the transmitting using device. The data packet includes the address of the receiving using device.

Interface stages 19 each include encoding and decoding logic for packetizing and depacketizing the data relative to the using device, address recognition circuitry for detecting the address of received packets and associated transmitter control circuitry. Reference is made to U.S. Pat. No. 4,063,220 for further details regarding the interface stages.

Figure 2:
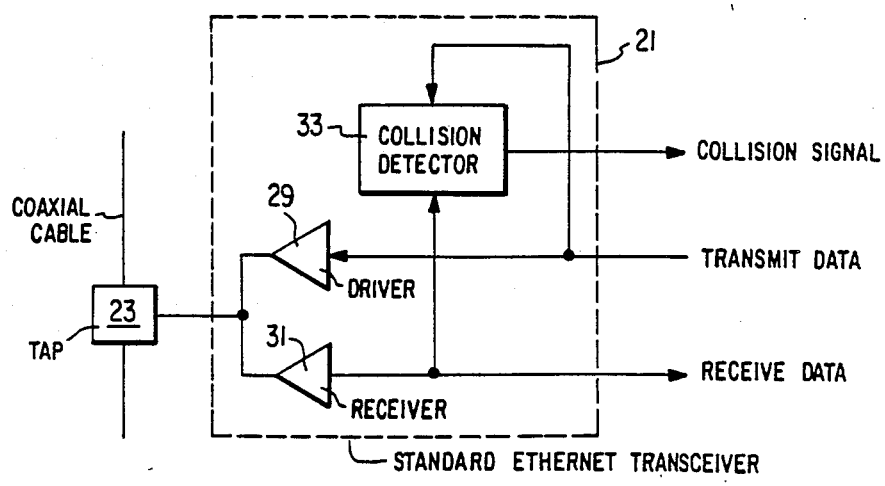
FIG. 2 is a block circuit diagram of a prior art transceiver used in the arrangement shown in FIG. 1.

FIG. 2 illustrates a standard ETHERNET transceiver 21 which has been used for the various transceivers shown in the prior art arrangement of FIG. 1. Each transceiver 21 includes a driver stage 29 for transmitting data onto the coaxial cable via the tap 23, a receiver 31 for receiving data communicated on the coaxial cable via tap 23 by another transceiver and a collision detector 33 connected to the input of driver 29 and the output of receiver 31 for generating a collision signal whenever data communicated on the cable by another transceiver is received by the transceiver during the time that the latter transceiver is transmitting data onto the medium.

A data packet transmitted by one using station is transmitted in both directions along the coaxial cable and eventually propagates to all using stations on the network. However, only the using station having an address matching that contained in the data packet actually receives the packet. The interface stage associated with the receiving using station contains the necessary logic for address decoding and putting the data contained in the packet in a usable form for the using device.

Data packet size, propagation velocity in the coaxial cable, propagation delay in components, and cable data transmission rate combine to impose constraints on the physical lengths of cable which may be used to implement an ETHERNET system. For a commercially available ETHERNET system a single coaxial cable may be up to 500 meters long. Repeater stations are used to link up the individual ETHERNET cable segments.

Referring again to FIG. 1, each repeater station 13 is bidirectional in operation and includes repeater logic 27 for determining which direction to repeat a data packet without external control. Each repeater logic 27 is connected to the vertical riser cable 12 and the associated horizontal cable segment 10 or 11 via a transceiver 21 configured as shown in FIG. 2. Repeater logic 27 is capable of responding to the detection of a collision by its respective transceivers by passing a collision jam signal back onto the incoming cable segment via the incoming transceiver transmitter. For further details regarding the ETHERNET repeating station reference is made to U.S. Pat. No. 4,099,024.

In considering a multistory installation as shown in FIG. 1, from a reliability viewpoint, a major risk is quickly revealed. If the vertical riser is damaged so as to render all or part of it unuseable, then using stations on one floor may not be able to communicate with using stations on another floor. In the worst case, with a totally inoperative vertical riser, operation will be limited to communication between using stations located on the same floor; no interfloor communications could take place. In accordance with the invention a redundancy arrangement is provided whereby one of a plurality of vertical riser cable segments may be selectively chosen to provide reliable communication.

Figure 3:
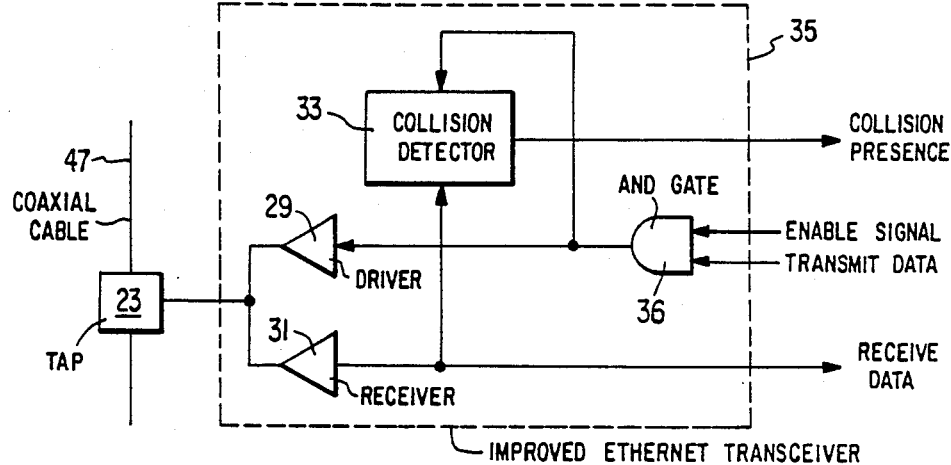
FIG. 3 is a block circuit diagram of a modified transceiver modified for carrying out the present invention.

FIG. 3 illustrates a modified ETHERNET transceiver 35 for carrying out the present invention. As can be seen, transceiver 35 is similar to the standard ETHERNET transceiver 21 shown in FIG. 2 except that the transmit data is coupled to driver 29 via one input of an AND gate 36 when an enable signal is present at the other input of AND gate 36. The enable signal originates from a central control unit 39 as shown in FIG. 4.

Figure 4:
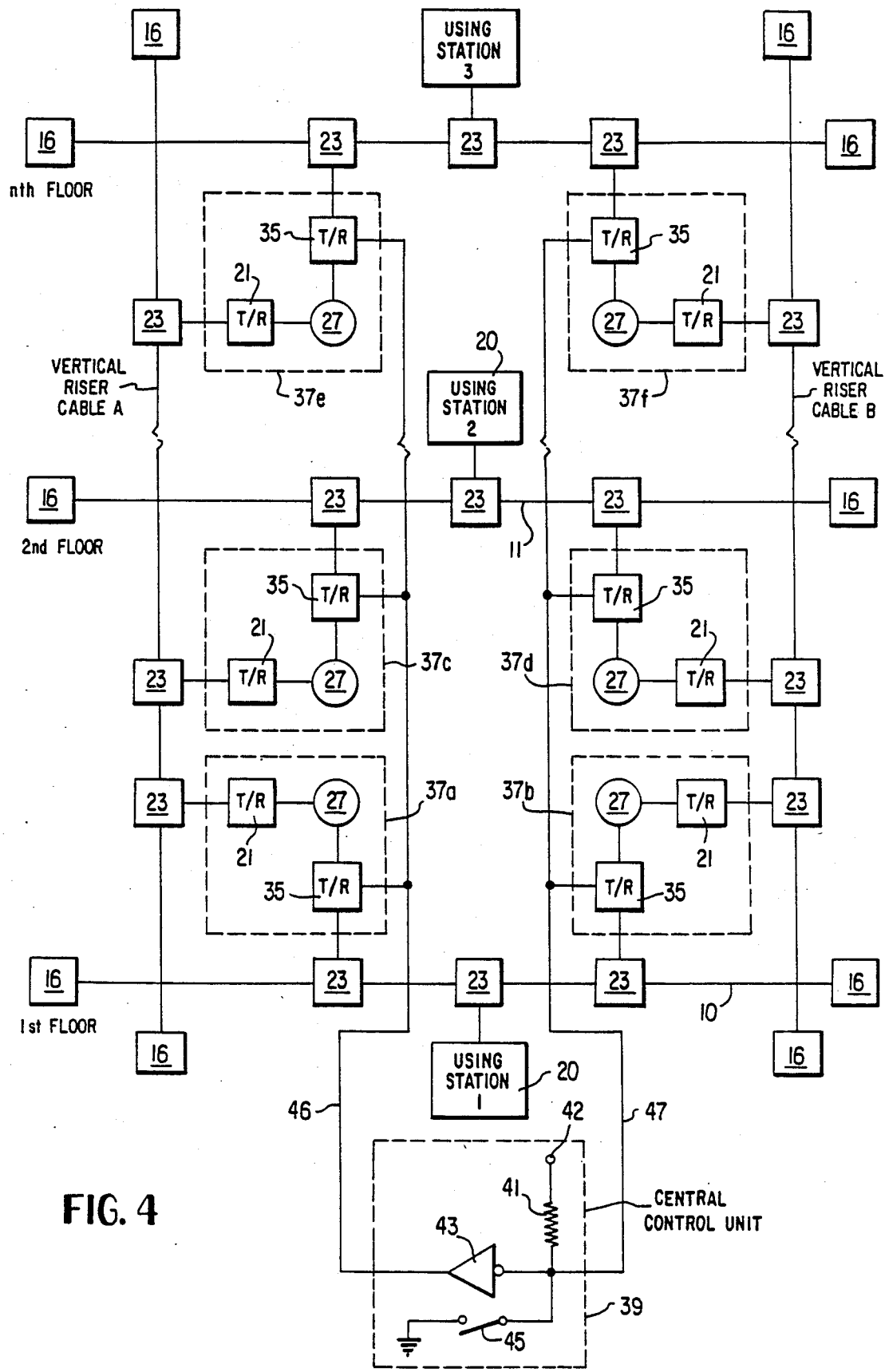
FIG. 4 is a block circuit diagram of a local area network employing the transceiver of FIG. 3 in a redundancy arrangement in accordance with the invention.

FIG. 4 shows a multi-segment ETHERNET LAN modified in accordance with the principles of the present invention. FIG. 4 is similar to FIG. 1 in that horizontal cable segments, which constitute distribution ETHERNETs for respective floors of a building, are interconnected so that a using device on one floor may establish communication with a using device on another floor. In FIG. 4, however, the horizontal cable segments are interconnected by not one, but two vertical riser cables 12 and 12a. Vertical riser cables 12 and 12a are tied to each horizontal cable segment via respective repeater stations each of which contains an improved transceiver 35 as illustrated in FIG. 3 for connecting the repeater logic 27 of each repeater circuit 37 to the respective horizontal cable segment. Each of the improved transceivers 35 are connected to a central control unit 39 via a respective one of lines 46 and 47 for receiving an enabling or disabling signal depending on which vertical riser cable is selected by control unit 39 for interconnecting the horizontal cable segments.

Central control unit 39 includes a resistor 41 connected at one end to a source of positive voltage 42 and at the other end to an inverter 43 whose input can be selectively grounded via a switch 45. Inverter 43 is biased to produce a positive signal on its output when its input is grounded. Thus, when switch 45 is open a high signal appears on line 47 and a low signal appears on line 46 and when switch 45 is closed a low signal appears on line 47 and a high signal appears on line 46. If AND gates 36 are constructed so that a low signal constitutes an enable signal and a high signal constitutes a disable signal, then when switch 45 is open an enable signal will appear on line 46 so as to activate cable 12a whereas a disable signal will appear on line 47 which will effectively disconnect cable 12.

In operation, when a data packet is transmitted by using station 1 on the 1st floor, such data packet is transmitted on cable segment 10 in both directions. The transceivers 35 associated with the repeater stations 37a-37f connecting cable segment 10 to vertical riser cables 12 and 12a each receive the data packet which is then retransmitted on both riser cables 12 and 12a. The data packet will be received by the transceiver 21 associated with each repeater station connecting the horizontal cable segments via the vertical user cables 12 and 12a on each of the other floors. However, depending on the position of switch 45 in control unit 39, the drivers 29 (See FIG. 3) of the transceivers 35 in only the repeater stations associated with one of the vertical riser cables 12 or 12a will be enabled and the drivers 29 in the other transceivers 35 will be disabled. Thus, only the transmission on one of the vertical risers 12 or 12a will be retransmitted onto horizontal cable segments on the other floors. If a failure occurs in the active vertical riser cable, then the position of switch 45 in control unit 39 can be changed, which effectively disconnects the damaged vertical riser cable and connects the other vertical riser cable.

It should be understood that the schematic in FIG. 4 is merely exemplary of how a second vertical riser cable can be employed to provide redundancy in the communication medium of a local area network. Greater reliability could be provided by installing more than two vertical risers with repeater stations having improved transceivers in a manner similar to that illustrated in FIGS. 3 and 4. In such a case, the control unit 39 would be modified so as to enable only the transceivers 35 associated with the repeater stations connected with one of the vertical risers and to disable the transceivers 35 associated with the repeater stations connecting each of the other vertical riser cables.

Figure 5:
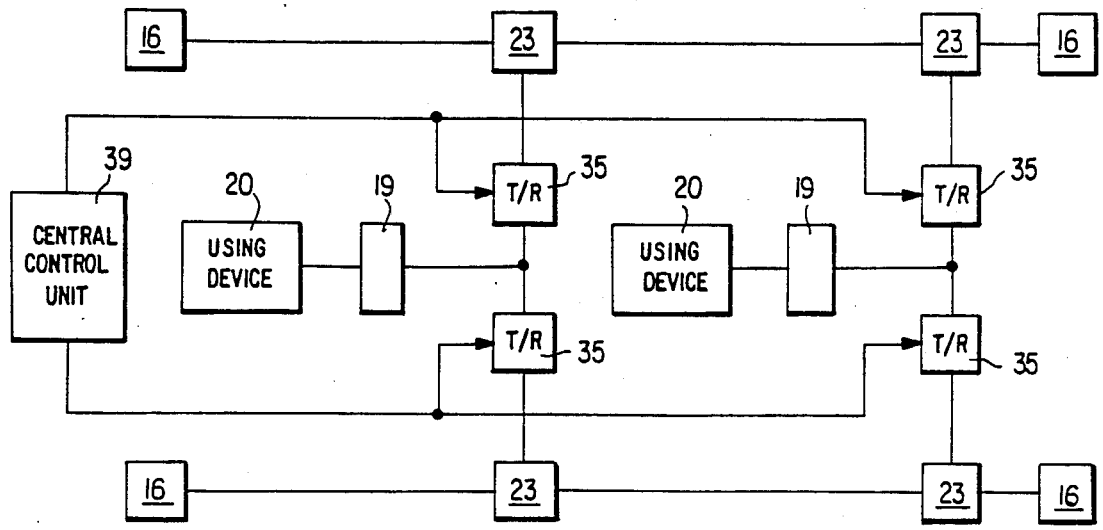
FIG. 5 is a block circuit diagram of a local area network employing the transceiver of FIG. 3 in a further redundancy arrangement according to the invention.

FIG. 5 illustrates a further aspect of the invention wherein in accordance with the principles of the invention redundancy is provided to a single cable segment by providing a second cable segment and connecting each of the data using devices to each of the redundant cables via an improved transceiver 35 of the type illustrated in FIG. 3 and controlling the respective transceivers via a control unit similar to that illustrated in FIG. 4.

The redundancy arrangement illustrated in FIG. 4 may be further modified by providing more than one control unit 47 so that the vertical risers can be activated and deactivated from more than one location. The transceivers of FIG. 3 may be further modified by providing an enabling circuit within the transceiver that disables the transceiver in the event of loss of the control signal from the central control unit.

It should be further appreciated that the redundancy arrangement according to the invention is not limited to the use of modified transceivers as shown in FIG. 3. Other suitable means for activating and deactivating the respective vertical riser cable segments, or the equivalents thereof, from a central location may be employed within the scope of the invention.

It will be understood that the above description of the present invention is susceptable to various modifications, changes and adaptations, and the same are intended to be comprehended within the meaning and range of equivalence of the appended claims.

What is claimed is:

1. A redundancy arrangement for a multiple access communication system having a bidirectional communication bus for carrying data signals, the bus being composed of at least first, second and third segments, and a first plurality of bidirectional repeater stations each connecting the third segment to a respective one of the first and second segments for providing bidirectional data transmission between the first and third segments and between the second and third segments comprising:
   a fourth bus segment;
   a second plurality of bidirectional repeater stations each connecting said fourth segment to a respective one of the first and second segments for providing bidirectional data transmission between the first and fourth segments and between the second and fourth segments;
   a plurality of controllable switch means each connected for selectively enabling the bidirectional data transmission of a respective one of said repeater stations; and
   central control means connected to each said controllable switch means and producing a first operating mode control signal for causing said plurality of controllable switch means to enable bidirectional data transmission of only said first plurality of repeater stations and producing a second operating mode control signal for causing said plurality of controllable switch means to enable bidirectional data transmission of only said second plurality of repeater stations.

2. An arrangement as defined in claim 1, wherein each said repeater station includes first and second transceivers and repeater logic connected to a respective one of the cable segments to which that repeater station is connected via a respective one of said first and second transceivers, and the controllable switch means connected to that repeater station is connected between said repeater logic and a selected one or both of said first and second transceivers.

3. An arrangement as defined in claim 2, wherein each said transceiver includes a driver stage for transmitting data onto said bus and each said controllable switch means is connected to the driver stage of a respective one of said selected transceivers.

4. An arrangement as defined in claim 3, wherein each said controllable switch means comprises an AND gate.

5. A local area network for a multiple access communication system comprising:
   a bidirectional communication bus for providing a bidirectional transmitting medium for data signals, said bus including at least two bidirectional segments for providing alternate paths for the data signals;
   a plurality of stations connected to said bus, each station including transceiver means for transmitting data signals onto said bus and for receiving data signals from said bus;
   a plurality of controllable switch means each connected for selectively disabling at least one of the transmitting and receiving functions of a respective one of said transceiver means, said transceiver means including first and second groups of transceiver means, each group being connected to a respective one of said at least two bus segments; and
   central control means connected to each said controllable switch means and having a first mode for causing said plurality of controllable switch means to disable at least one of the transmitting and receiving functions of each transceiver means in only said first group and a second mode for causing said plurality of controllable switch means to disable at least one of the transmitting and receiving functions of each transceiver means in only said second group.

6. A network as defined in claim 5, wherein said plurality of stations includes first and second pluralities of bidirectional repeater stations and said bus comprises at least first, second, third and fourth bus segments, said first and second segments each being connected to said third segment by a respective one of the repeater stations in said first plurality of repeater stations and said first and second segments each being connected to said fourth segment by a respective one of the repeater stations in said second plurality of repeater stations, and the transceiver means in said first group of transceiver means each being associated with a respective one of the repeater stations of said first plurality of repeater stations and the transceiver means of said second group of transceiver means each being associated with a respective one of the repeater stations of said second plurality of repeater stations.

7. A network as defined in claim 6, wherein each of said transceiver means includes a driver stage for transmitting data onto said bus and each said controllable switch means is connected to the driver stage of a respective one of said transceiver means.

8. A network as defined in claim 6, wherein each said controllable switch means comprises an AND gate.

9. A network as defined in claim 5, wherein said plurality of stations includes a plurality of data using stations each including a data using device connected to a respective one of said bus segments via a respective one of said transceiver means, and said controllable switch is connected to each said transceiver means.

10. A network as defined in claim 9, wherein each said controllable switch means comprises an AND gate.

* * * * *